United States Patent
Surnilla et al.

(10) Patent No.: US 9,518,529 B2
(45) Date of Patent: Dec. 13, 2016

(54) METHODS AND SYSTEMS FOR AN INTAKE OXYGEN SENSOR

(71) Applicant: Ford Global Technologies, LLC, Dearborn, MI (US)

(72) Inventors: Gopichandra Surnilla, West Bloomfield, MI (US); Timothy Joseph Clark, Livonia, MI (US); James Alfred Hilditch, Canton, MI (US); Matthew John Gerhart, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 490 days.

(21) Appl. No.: 14/052,633

(22) Filed: Oct. 11, 2013

(65) Prior Publication Data

US 2015/0101564 A1    Apr. 16, 2015

(51) Int. Cl.
| | |
|---|---|
| F02D 43/00 | (2006.01) |
| F02D 41/00 | (2006.01) |
| F02D 41/14 | (2006.01) |
| F02D 41/30 | (2006.01) |

(52) U.S. Cl.
CPC ............ F02D 43/00 (2013.01); F02D 41/005 (2013.01); F02D 41/0072 (2013.01); F02D 41/1401 (2013.01); F02D 41/144 (2013.01); F02D 41/1441 (2013.01); F02D 41/1456 (2013.01); *F02D 41/30* (2013.01); *F02D 2041/141* (2013.01); *F02D 2041/1431* (2013.01); *Y02T 10/47* (2013.01)

(58) Field of Classification Search
CPC .... F02D 43/00; F02D 41/005; F02D 41/0072; F02D 41/1401; F02D 41/144; F02D 41/1441; F02D 41/1456; F02D 41/0052
USPC ............................ 73/114.75, 114.76, 114.01, 114.02,73/114.31, 114.32, 114.36, 114.37, 114.69,73/114.71, 114.72, 114.73, 114.74, 23.2,73/23.31, 23.32; 60/272, 274, 276, 278, 279, 60/280, 282, 283, 288, 289, 290, 292, 305, 60/320, 323, 324, 39.5, 39.52, 685, 686, 694; 123/322, 323, 344, 345, 346, 347, 348, 123/350, 406.44, 406.45, 406.47, 406.48, 406.3, 123/406.31, 406.49, 434, 672, 683, 698, 700, 123/704, 568.11, 568.12, 568.13, 568.15, 123/568.16, 568.17, 568.18, 568.19, 568.2, 123/568.21, 568.22, 568.26, 568.31, 572, 123/184.21, 184.24, 294, 295, 302
See application file for complete search history.

(56) References Cited

U.S. PATENT DOCUMENTS

| | | | |
|---|---|---|---|
| 4,614,175 A * | 9/1986 | Asayama | F02D 41/0052 123/568.26 |
| 4,915,080 A | 4/1990 | Nakaniwa et al. | |
| 4,942,860 A * | 7/1990 | Chujo | F02D 35/0038 123/406.44 |
| 5,201,303 A * | 4/1993 | Kojima | F02D 41/0072 123/568.26 |
| 5,291,673 A | 3/1994 | Hamburg et al. | |
| 6,073,611 A * | 6/2000 | Ohuchi | F02D 35/021 123/1 A |

(Continued)

OTHER PUBLICATIONS

McConville, Gregory M. et al., "Compressor Bypass Turbine-Generator," U.S. Appl. No. 13/707,443, filed Dec. 6, 2012, 32 pages.

(Continued)

*Primary Examiner* — Hung Q Nguyen
*Assistant Examiner* — John Bailey
(74) *Attorney, Agent, or Firm* — Julia Voutyras; Alleman Hall McCoy Russell & Tuttle LLP

(57) ABSTRACT

Methods and systems are provided for correcting an EGR rate determined based on an intake manifold oxygen sensor based on an air-fuel ratio of EGR. The output of the sensor is corrected to compensate for extra fuel in rich EGR or extra air in lean EGR and used to reliably estimate the EGR rate. One or more engine operating parameters are adjusted based on an uncorrected output of the sensor.

20 Claims, 5 Drawing Sheets

(56) References Cited

U.S. PATENT DOCUMENTS

| | | | | |
|---|---|---|---|---|
| 6,739,177 | B2* | 5/2004 | Sato | F02D 41/0037 73/114.71 |
| 6,742,379 | B2* | 6/2004 | Matsubara | F02D 41/144 73/1.06 |
| 7,073,493 | B2* | 7/2006 | Nakasaka | F01L 1/053 123/305 |
| 7,275,514 | B2* | 10/2007 | Kuo | F01L 13/00 123/299 |
| 7,360,523 | B2* | 4/2008 | Sloane | F02B 17/005 123/294 |
| 7,503,312 | B2* | 3/2009 | Surnilla | F02D 41/0082 123/198 F |
| 7,689,343 | B2* | 3/2010 | Dagci | F02D 35/023 123/406.47 |
| 7,694,508 | B2 | 4/2010 | Iida et al. | |
| 7,694,760 | B2* | 4/2010 | Leone | B60K 6/445 180/65.21 |
| 7,813,867 | B2* | 10/2010 | Yasui | F02D 41/1403 123/688 |
| 8,020,538 | B2* | 9/2011 | Surnilla | F02M 26/47 123/568.12 |
| 8,042,518 | B2* | 10/2011 | Jankovic | F02D 41/0025 123/304 |
| 8,103,428 | B2* | 1/2012 | Russ | F02M 26/00 123/406.23 |
| 8,347,852 | B2 | 1/2013 | Glugla et al. | |
| 8,868,317 | B2* | 10/2014 | Aoki | F02D 41/0085 123/1 A |
| 8,903,627 | B2* | 12/2014 | Morita | F02D 19/084 123/434 |
| 9,181,904 | B2* | 11/2015 | Jankovic | F02D 41/0002 |
| 9,234,476 | B2* | 1/2016 | Hakeem | F02D 41/144 |
| 9,273,602 | B2* | 3/2016 | Surnilla | F02B 47/08 |
| 9,328,679 | B2* | 5/2016 | Clark | F02D 41/0052 |
| 9,328,684 | B2* | 5/2016 | Surnilla | F02M 25/0854 |
| 9,382,861 | B2* | 7/2016 | Jankovic | F02D 41/144 |
| 2002/0014103 | A1* | 2/2002 | Matsubara | F02D 41/144 73/1.06 |
| 2002/0104520 | A1* | 8/2002 | Nakasaka | F01L 1/053 123/673 |
| 2002/0139360 | A1* | 10/2002 | Sato | F02D 41/0037 123/698 |
| 2004/0134462 | A1* | 7/2004 | Strom | F02B 1/12 123/294 |
| 2004/0182379 | A1* | 9/2004 | Yamada | F02D 41/1456 123/688 |
| 2008/0046128 | A1* | 2/2008 | Sasaki | F02D 35/026 700/274 |
| 2009/0112447 | A1* | 4/2009 | Ishizuka | F02D 33/02 701/109 |
| 2010/0332075 | A1* | 12/2010 | Clarke | F02D 41/0072 701/33.4 |
| 2011/0054763 | A1* | 3/2011 | Oehlerking | F02D 41/0007 701/108 |
| 2011/0139133 | A1* | 6/2011 | Surnilla | F02M 26/47 123/568.12 |
| 2011/0202258 | A1* | 8/2011 | Fukushima | F02D 31/002 701/104 |
| 2012/0023937 | A1* | 2/2012 | Styles | F02M 26/42 60/605.2 |
| 2012/0037134 | A1* | 2/2012 | Jankovic | F02D 41/0002 123/568.21 |
| 2012/0324864 | A1 | 12/2012 | Krengel et al. | |
| 2013/0035841 | A1 | 2/2013 | Glugla et al. | |
| 2013/0138329 | A1* | 5/2013 | Aoki | F02D 41/0085 701/104 |
| 2014/0014079 | A1* | 1/2014 | Yacoub | F02D 41/144 123/568.16 |
| 2014/0158086 | A1* | 6/2014 | Matsuda | F02D 13/0207 123/294 |
| 2014/0216394 | A1* | 8/2014 | Matsuda | F02D 13/0223 123/295 |
| 2014/0238369 | A1* | 8/2014 | Jankovic | F02D 41/144 123/690 |
| 2014/0251285 | A1* | 9/2014 | Surnilla | F02B 47/08 123/520 |
| 2014/0288804 | A1* | 9/2014 | Pursifull | F02D 41/1454 701/104 |
| 2015/0051811 | A1* | 2/2015 | Song | F02D 41/144 701/104 |
| 2015/0075503 | A1* | 3/2015 | Surnilla | F02M 25/0854 123/520 |

OTHER PUBLICATIONS

Surnilla, Gopichandra et al., "Methods and Systems for an Oxygen Sensor," U.S. Appl. No. 14/052,635, filed Oct. 11, 2013, 55 pages.

* cited by examiner

METHODS AND SYSTEMS FOR AN INTAKE OXYGEN SENSOR

TECHNICAL FIELD

The present application relates generally to a gas constituent sensor included in an intake system of an internal combustion engine.

BACKGROUND AND SUMMARY

Engine systems may utilize recirculation of exhaust gas from an engine exhaust system to an engine intake system (intake passage), a process referred to as exhaust gas recirculation (EGR), to reduce regulated emissions and improve fuel economy. An EGR system may include various sensors to measure and/or control the EGR. As one example, the EGR system may include an intake gas constituent sensor, such as an oxygen sensor, which may be employed during non-EGR conditions to determine the oxygen content of fresh intake air. During EGR conditions, the sensor may be used to infer EGR based on a change in oxygen concentration due to addition of EGR as a diluent. One example of such an intake oxygen sensor is shown by Matsubara et al. in U.S. Pat. No. 6,742,379. The EGR system may additionally or optionally include an exhaust gas oxygen sensor coupled to the exhaust manifold for estimating a combustion air-fuel ratio.

As such, due to the location of the oxygen sensor downstream of an outlet of the EGR passage, the sensor may be sensitive to the air-fuel ratio of EGR. For example, when the engine runs with rich EGR, there is excess fuel (e.g., excess CO and $H_2$) in the EGR. The excess fuel can react with oxygen at the sensing element of the intake oxygen sensor, reducing the oxygen concentration detected by the sensor. In addition to some of the oxygen in the air becoming equilibrated with the CO and $H_2$ from the EGR, there is also a secondary effect due to smaller $H_2$ molecules diffusing faster through the diffusion barrier of the oxygen sensor's sensing element, making the sensor output read richer than the true amount of excess fuel in the EGR. As another example, when the engine runs with lean EGR, the EGR contains extra air and for a given mass flow rate, the amount of real diluent in the EGR is lower. The excess oxygen in the lean EGR may be interpreted by the intake oxygen sensor as a lower EGR rate.

Matsubara teaches learning an initial calibration coefficient for the intake oxygen sensor during selected conditions when the sensor is sufficiently warm and further adjusting the calibration coefficient if the EGR is too rich or too lean. The adjusted calibration coefficient is then used to correct the output of the intake sensor.

However, the inventors have identified potential issues with such an approach. One or more other engine operating parameters are also affected by the misrepresentation of EGR by the intake oxygen sensor in the presence of rich or lean (relative to stoichiometry) EGR. For example, in the presence of lean EGR, although the sensor measures a lower (absolute) amount of EGR, the sensor output correctly reflects the burnt gas fraction. As a result, any adjustments to spark timing, throttle position, and/or fuel injection that are based on the adjusted calibration coefficient may be incorrect. As another example, in the presence of rich EGR, the sensor does not provide an accurate estimate of how much excess fuel is in the EGR. As such, if the excess fuel is not properly accounted for in cylinder fuel injection, the fuel injected will be higher than desired. This may cause open-loop fueling of the engine to be richer than desired. In the closed-loop fuel control, the adaptive fuel may adapt for the excess fuel in the EGR but the adaptive correction will be attributed to a fuel system error. This may falsely trigger a fuel system error if the correction is above a threshold. The problem may be exacerbated due to a delay between the timing of fuel injection and the sensing of the fuel at the intake oxygen sensor. Likewise, there may be delay between the EGR estimated at an exhaust oxygen sensor relative to the EGR estimated at the intake oxygen sensor. In either case, engine fueling and EGR control may be disrupted.

In one example, some of the above issues may be addressed by a method for an engine comprising: in response to an EGR air-fuel ratio being richer than a threshold, correcting an intake manifold oxygen sensor output with a correction factor based on a richness of the EGR air-fuel ratio, and adjusting each of an EGR rate and a cylinder fuel injection based on the corrected sensor output. In this way, the effect of EGR air-fuel ratio variation on the intake oxygen sensor can be accounted for and the EGR estimation and engine fueling accordingly compensated.

For example, during EGR conditions, an EGR air-fuel ratio (AFR) may be estimated by an exhaust gas oxygen sensor while an EGR rate is estimated by an intake gas oxygen sensor. If the EGR air-fuel ratio is determined to be richer than a threshold (e.g., richer than stoichiometry), a (first) correction factor may be learned based on the degree of richness of the EGR as well as an alcohol (e.g., ethanol) content of the combusted fuel. The correction factor is then applied on the output of the intake oxygen sensor to reduce the measured EGR rate based on the richness. An EGR valve may then be feedback adjusted to provide a target EGR rate. In addition, an excess fuel content of the rich EGR may be estimated based on the output of the intake sensor and the output of the exhaust sensor. A cylinder fuel injection may be adjusted based on the excess fuel content while factoring in transport delays between the exhaust sensor signal and the intake fuel injection timing.

In comparison, if the EGR air-fuel ratio is determined to be leaner than a threshold (e.g., leaner than stoichiometry), a (second) correction factor may be learned based on the degree of leanness of the EGR as well as an alcohol (e.g., ethanol) content of the combusted fuel. The correction factor is then applied on the output of the intake oxygen sensor to increase the measured EGR rate based on the leanness. An EGR valve may then be feedback adjusted to provide a target EGR rate. Alternatively, a correction factor may be applied only in the presence of rich EGR and no correction factor may be applied in the presence of lean EGR. In addition, since the intake sensor output correctly reflects the amount of burnt gas in the EGR, spark timing and airflow to the engine is adjusted based on the uncorrected sensor output.

In this way, an intake oxygen sensor output can be corrected for variations arising due to changing air-fuel ratio of EGR flowing through the sensor. By correcting the sensor output appropriately to compensate for the effects of rich or lean EGR, a more accurate dilution estimation can be provided by the sensor, improving EGR control. By inferring an amount of excess fuel in the rich EGR based on a known or calibrated composition of the rich EGR and the EGR rate determined from the corrected sensor output, and adjusting engine fuel injection in accordance, open and closed loop fuel control is improved. In addition, fewer fuel system errors may be falsely triggered. By inferring an amount of burnt gas in the lean EGR based on the uncorrected sensor output, and adjusting spark timing and intake throttle position in accordance, open and closed loop spark and air flow control is improved. Overall, corruption of sensor output when the EGR air-fuel ratio varies is reduced. By improving the accuracy of EGR dilution estimation in the presence of rich or lean EGR, engine fueling and EGR control can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
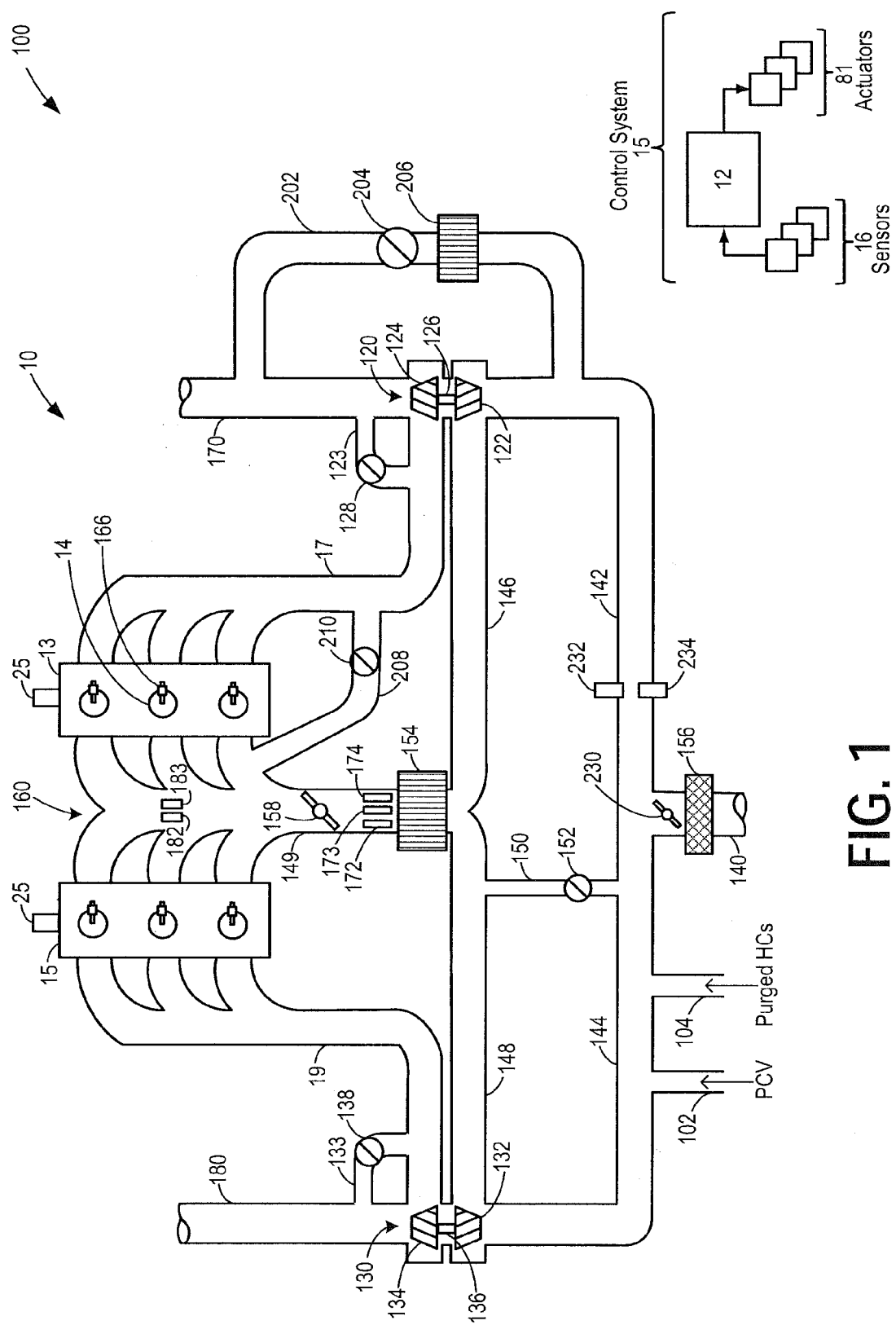
FIGS. 1-2 are schematic diagrams of an engine system.
Figure 2:
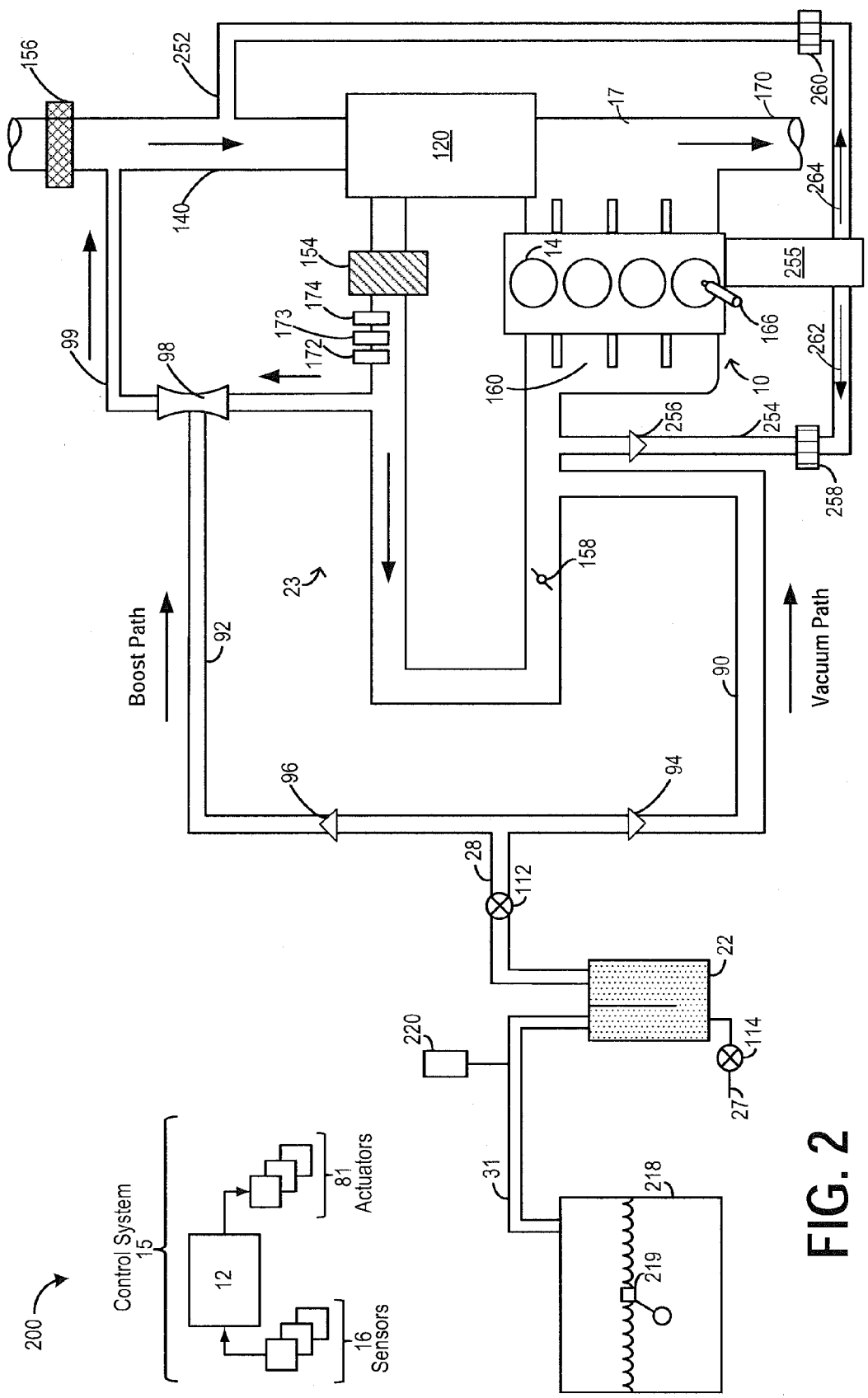
Figure 3A:
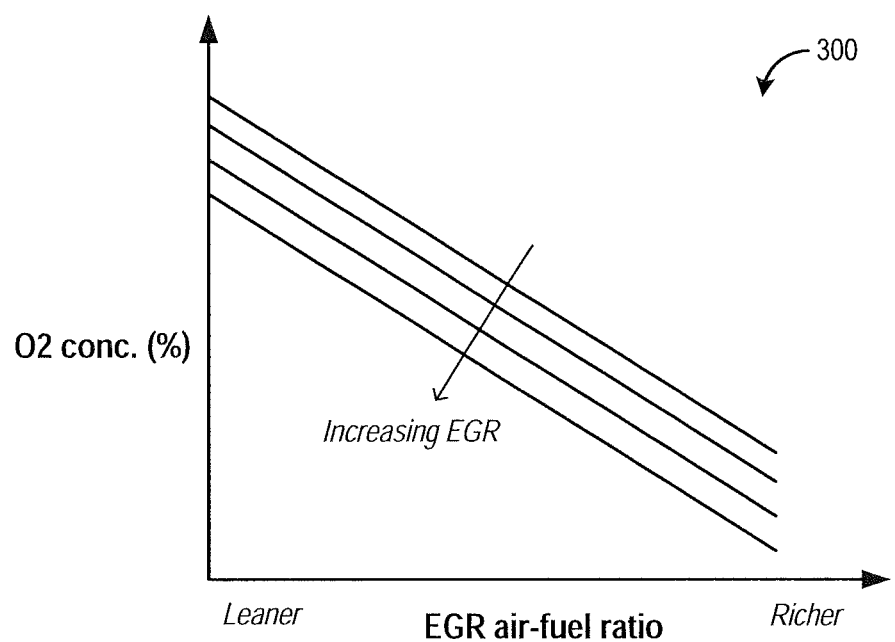
FIGS. 3A-C are maps depicting the impact of varying EGR air-fuel ratio on the oxygen concentration estimated by an intake manifold oxygen sensor.
Figure 3B:
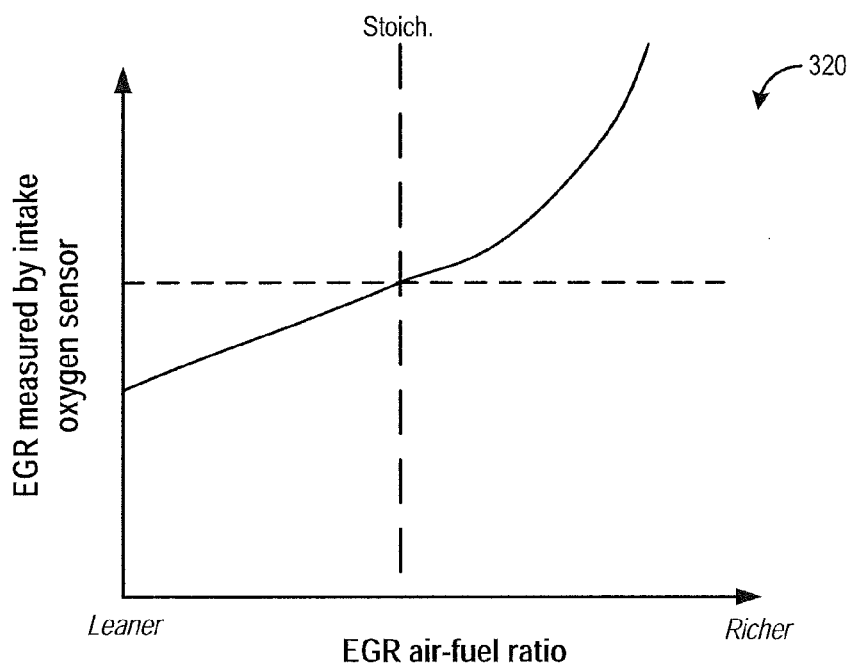
Figure 3C:
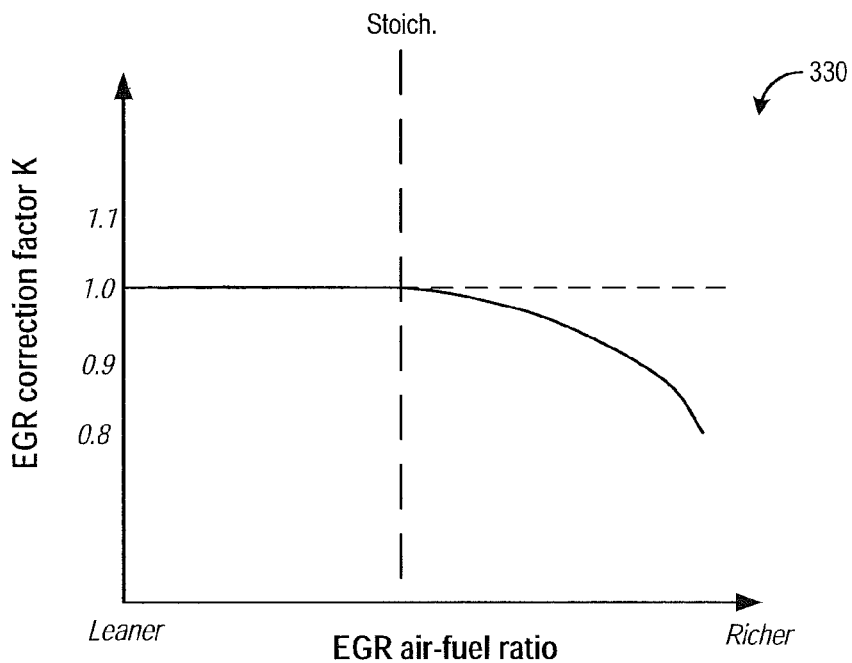

The present description is related to methods and system for using an intake manifold sensor for sensing an amount of EGR flow to an engine system, such as the engine systems of FIGS. 1-2. To overcome the effect of rich or lean EGR, as determined by an exhaust gas oxygen sensor, on an output of an intake gas oxygen sensor, as shown at FIGS. 3A-C, an inferred EGR estimate may be adjusted with a correction factor. A controller may be configured to perform a control routine, such as the routine of FIG. 4 to learn an amount of excess fuel in rich EGR, or excess oxygen in lean EGR, ingested into the engine and adjust an EGR flow accordingly. An output of the sensor, as well as an EGR dilution estimated by the sensor, may be adjusted to compensate for the effect of varying EGR air-fuel ratio on the output of the sensor. In this way, accuracy of EGR estimation by an intake oxygen sensor is increased.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156 and an EGR throttle valve 230. Engine system 100 may be a split-engine system wherein intake passage 140 is branched downstream of EGR throttle valve 230 into first and second parallel intake passages, each including a turbocharger compressor. Specifically, at least a portion of intake air is directed to compressor 122 of turbocharger 120 via a first parallel intake passage 142 and at least another portion of the intake air is directed to compressor 132 of turbocharger 130 via a second parallel intake passage 144 of the intake passage 140.

The first portion of the total intake air that is compressed by compressor 122 may be supplied to intake manifold 160 via first parallel branched intake passage 146. In this way, intake passages 142 and 146 form a first parallel branch of the engine's air intake system. Similarly, a second portion of the total intake air can be compressed via compressor 132 where it may be supplied to intake manifold 160 via second parallel branched intake passage 148. Thus, intake passages 144 and 148 form a second parallel branch of the engine's air intake system. As shown in FIG. 1, intake air from intake passages 146 and 148 can be recombined via a common intake passage 149 before reaching intake manifold 160, where the intake air may be provided to the engine.

A first EGR throttle valve 230 may be positioned in the engine intake upstream of the first and second parallel intake passages 142 and 144, while a second air intake throttle valve 158 may be positioned in the engine intake downstream of the first and second parallel intake passages 142 and 144, and downstream of the first and second parallel branched intake passages 146 and 148, for example, in common intake passage 149.

In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Intake passage 149 can include a charge air cooler (CAC) 154 and/or a throttle (such as second throttle valve 158). The position of throttle valve 158 can be adjusted by the control system via a throttle actuator (not shown) communicatively coupled to controller 12. An anti-surge valve 152 may be provided to selectively bypass the compressor stages of turbochargers 120 and 130 via bypass passage 150. As one example, anti-surge valve 152 can open to enable flow through bypass passage 150 when the intake air pressure upstream of the compressors attains a threshold value.

Intake manifold 160 may further include an intake gas oxygen sensor 172. In one example, the oxygen sensor is a UEGO sensor. As elaborated herein, the intake gas oxygen sensor may be configured to provide an estimate regarding the oxygen content of fresh air received in the intake manifold. In addition, when EGR is flowing, a change in oxygen concentration at the sensor may be used to infer an EGR amount and used for accurate EGR flow control. In the depicted example, oxygen sensor 172 is positioned upstream of throttle 158 and downstream of charge air cooler 154. However, in alternate embodiments, the oxygen sensor may be positioned upstream of the CAC. A pressure sensor 174 may be positioned alongside the oxygen sensor for estimating an intake pressure at which an output of the oxygen sensor is received. Since the output of the oxygen sensor is influenced by the intake pressure, a reference oxygen sensor output may be learned at a reference intake pressure. In one example, the reference intake pressure is a throttle inlet pressure (TIP) where pressure sensor 174 is a TIP sensor. In alternate examples, the reference intake pressure is a manifold pressure (MAP) as sensed by MAP sensor 182.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific parallel exhaust passages. In the depicted example, a first bank 13 of cylinders of engine 10 can exhaust products of combustion via a first parallel exhaust passage 17 and a second bank 15 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gas flowing through exhaust passage 19 can bypass turbine 134 via turbine bypass passage 133 as controlled by wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust after-treatment devices, such as a catalyst, and one or more exhaust gas sensors.

Engine 10 may further include one or more exhaust gas recirculation (EGR) passages, or loops, for recirculating at least a portion of exhaust gas from the exhaust manifold to the intake manifold. These may include high-pressure EGR loops for proving high-pressure EGR (HP-EGR) and low-pressure EGR-loops for providing low-pressure EGR (LP-EGR). In one example, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously.

In the depicted example, engine 10 may include a low-pressure EGR loop 202 for recirculating at least some exhaust gas from the first branched parallel exhaust passage 170, downstream of the turbine 124, to the first parallel intake passage 142, upstream of the compressor 122. In some embodiments, a second low-pressure EGR loop (not shown) may be likewise provided for recirculating at least some exhaust gas from the second branched parallel exhaust passage 180, downstream of the turbine 134, to the second parallel intake passage 144, upstream of the compressor 132. LP-EGR loop 202 may include LP-EGR valve 204 for controlling an EGR flow (i.e., an amount of exhaust gas recirculated) through the loops, as well as a charge air cooler 206 for lowering a temperature of exhaust gas flowing through the EGR loop before recirculation into the engine intake. Under certain conditions, the charge air cooler 206 may also be used to heat the exhaust gas flowing through LP-EGR loop 202 before the exhaust gas enters the compressor to avoid water droplets impinging on the compressors.

Engine 10 may further include a first high-pressure EGR loop 208 for recirculating at least some exhaust gas from the first parallel exhaust passage 17, upstream of the turbine 124, to intake manifold 160, downstream of intake throttle 158. Likewise, the engine may include a second high-pressure EGR loop (not shown) for recirculating at least some exhaust gas from the second parallel exhaust passage 19, upstream of the turbine 134, to the second branched parallel intake passage 148, downstream of the compressor 132. EGR flow through HP-EGR loops 208 may be controlled via HP-EGR valve 210.

A PCV port 102 may be configured to deliver crankcase ventilation gases (blow-by gases) to the engine intake manifold along second parallel intake passage 144. In some embodiments, flow of PCV air through PCV port 102 may be controlled by a dedicated PCV port valve. Likewise, a purge port 104 may be configured to deliver purge gases from a fuel system canister to the engine intake manifold along passage 144. In some embodiments, flow of purge air through purge port 104 may be controlled by a dedicated purge port valve.

Humidity sensor 232 and pressure sensor 234 may be included in only one of the parallel intake passages (herein, depicted in the first parallel intake air passage 142 but not in the second parallel intake passage 144), downstream of EGR throttle valve 230. Specifically, the humidity sensor and the pressure sensor may be included in the intake passage not receiving the PCV or purge air. Humidity sensor 232 may be configured to estimate a relative humidity of the intake air. In one embodiment, humidity sensor 232 is a UEGO sensor configured to estimate the relative humidity of the intake air based on the output of the sensor at one or more voltages. Since purge air and PCV air can confound the results of the humidity sensor, the purge port and PCV port are positioned in a distinct intake passage from the humidity sensor. Pressure sensor 234 may be configured to estimate a pressure of the intake air. In some embodiments, a temperature sensor may also be included in the same parallel intake passage, downstream of the EGR throttle valve 230.

As such, intake oxygen sensor 172 may be used for estimating an intake oxygen concentration and inferring an amount of EGR flow through the engine based on a change in the intake oxygen concentration upon opening of the EGR valve 204. Specifically, a change in the output of the sensor upon opening the EGR valve is compared to a reference point where the sensor is operating with no EGR (the zero point). Based on the change (e.g., decrease) in oxygen amount from the time of operating with no EGR, an EGR flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR relative to sensor output in the absence of EGR (the zero point). Based on a deviation of the estimated EGR flow from the expected (or target) EGR flow, further EGR control may be performed.

A zero point estimation of the intake oxygen sensor may be performed during idle conditions where intake pressure fluctuations are minimal and when no PCV or purge air is ingested into the engine. In addition, the idle adaptation may be performed periodically, such as at every first idle following an engine start, to compensate for the effect of sensor aging and part-to-part variability on the sensor output.

A zero point estimation of the intake oxygen sensor may alternatively be performed during engine non-fueling conditions, such as during a deceleration fuel shut off (DFSO). By performing the adaptation during DFSO conditions, in addition to reduced noise factors such as those achieved during idle adaptation, sensor reading variations due to EGR valve leakage can be reduced.

Returning to FIG. 1, the position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 100 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include humidity sensor 232, intake air pressure sensor 234, MAP sensor 182, MCT sensor 183, TIP sensor 174, and intake air oxygen sensor 172. In some examples, common intake passage 149 may further include a throttle inlet temperature sensor for estimating a throttle air temperature (TCT). In other examples, one or more of the EGR passages may include pressure, temperature, and air-to-fuel ratio sensors, for determining EGR flow characteristics. As another example, actuators 81 may include fuel injector 166, HP-EGR valves 210 and 220, LP-EGR valves 204 and 214, throttle valves 158 and 230, and wastegates 128, 138. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIG. 4.

Now turning to FIG. 2, another example embodiment 200 of the engine of FIG. 1 is shown. As such, components previously introduced in FIG. 1 are numbered similarly and not re-introduced here for reasons of brevity.

Embodiment 200 shows a fuel tank 218 configured to deliver fuel to engine fuel injectors. A fuel pump (not shown) immersed in fuel tank 218 may be configured to pressurize fuel delivered to the injectors of engine 10, such as to injector 166. Fuel may be pumped into the fuel tank from an external source through a refueling door (not shown). Fuel tank 218 may hold a plurality of fuel blends, including fuel with a range of alcohol concentrations, such as various gasoline-ethanol blends, including E10, E85, gasoline, etc., and combinations thereof. A fuel level sensor 219 located in fuel tank 218 may provide an indication of the fuel level to controller 12. As depicted, fuel level sensor 219 may comprise a float connected to a variable resistor. Alternatively, other types of fuel level sensors may be used. One or more other sensors may be coupled to fuel tank 218 such as a fuel tank pressure transducer 220 for estimating a fuel tank pressure.

Vapors generated in fuel tank 218 may be routed to fuel vapor canister 22, via conduit 31, before being purged to engine intake 23. These may include, for example, diurnal and refueling fuel tank vapors. The canister may be filled with an appropriate adsorbent, such as activated charcoal, for temporarily trapping fuel vapors (including vaporized hydrocarbons) generated in the fuel tank. Then, during a later engine operation, when purge conditions are met, such as when the canister is saturated, the fuel vapors may be purged from the canister into the engine intake by opening canister purge valve 112 and canister vent valve 114.

Canister 22 includes a vent 27 for routing gases out of the canister 22 to the atmosphere when storing, or trapping, fuel vapors from fuel tank 218. Vent 27 may also allow fresh air to be drawn into fuel vapor canister 22 when purging stored fuel vapors to engine intake 23 via purge lines 90 or 92 (depending on boost level) and purge valve 112. While this example shows vent 27 communicating with fresh, unheated air, various modifications may also be used. Vent 27 may include a canister vent valve 114 to adjust a flow of air and vapors between canister 22 and the atmosphere. The vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

Fuel vapors released from canister 22, for example during a purging operation, may be directed into engine intake manifold 160 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc.

An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) may be obtained from MAP sensor 174 coupled to intake manifold 160, and communicated with controller 12. Alternatively, MAP may be inferred from alternate engine operating conditions, such as mass air flow (MAF), as measured by a MAF sensor coupled to the intake manifold.

Purge hydrocarbons may be directed to intake manifold 160 via either a boost path 92 or a vacuum path 90 based on engine operating conditions. Specifically, during conditions when turbocharger 120 is operated to provide a boosted aircharge to the intake manifold, the elevated pressure in the intake manifold causes one-way valve 94 in the vacuum path 90 to close while opening one-way valve 96 in the boost path 92. As a result, purge air is directed into the air intake passage 140, downstream of air filter 156 and upstream of charge air cooler 154 via the boost path 92. Herein, the purge air is introduced upstream of intake air sensor 172. In some embodiments, as depicted, a venturi 98 may be positioned in the boost path such that the purge air is directed to the intake upon passing through the venturi and passage 99. This allows the flow of purge air to be advantageously harnessed for vacuum generation.

During conditions when engine 10 is operated without boost, elevated vacuum in the intake manifold causes one-way valve 94 in the vacuum path to open while closing one-way valve 96 in the boost path. As a result, purge air is directed into the intake manifold 160, downstream of throttle 158 via the vacuum path 90. Herein, the purge air is introduced downstream of intake air sensor 172.

PCV hydrocarbons may also be directed to intake manifold 160 via either a boost side PCV hose 252 or a vacuum side PCV hose 254 based on engine operating conditions. Specifically, blow-by gases from engine cylinders 14 flow past the piston rings and enter crankcase 255. During conditions when turbocharger 120 is operated to provide a boosted aircharge to the intake manifold, the elevated pressure in the intake manifold causes one-way valve 256 in vacuum side PCV hose 254 to close. As a result, during boosted engine operating, PCV gases flow in a first direction (arrow 262) and are received in the engine intake downstream of the intake oxygen sensor. Specifically, PCV air is directed into the air intake passage 140, downstream of air filter 156 and upstream of charge air cooler 154 via boost side PCV hose 252. The PCV flow may be directed to the intake passage upon passage through a boost side oil separator 260. The boost side oil separator may be integrated into the cam cover or may be an external component. Thus, during boosted conditions, the PCV gases are introduced upstream of intake oxygen sensor 172 and therefore do affect the output of oxygen sensor 172.

In comparison, during conditions when engine 10 is operated without boost, elevated vacuum in the intake manifold causes one-way valve 256 in the vacuum side PCV hose 254 to open. As a result, during non-boosted engine operating, PCV gases flow in a second direction (arrow 264) different from the first direction and are received in the engine intake downstream of the intake oxygen sensor. In the depicted example, the second direction of PCV flow during non-boosted engine operation is opposite of the first direction of PCV flow during boosted engine operation (compare arrows 262 and 264). Specifically, during non-boosted operation, PCV air is directed into the intake manifold 160, directly, downstream of throttle 158 via the vacuum side PCV hose 254. Herein, the PCV air is introduced downstream of intake oxygen sensor 172, and therefore does not affect the output of oxygen sensor 172. Thus, due to the specific engine configuration, during boosted engine operation, PCV and purge air hydrocarbons are ingested into the engine intake manifold upstream of the intake oxygen sensor and are ingested into the engine intake manifold downstream of the intake oxygen sensor during non-boosted conditions.

As previously discussed, the intake air oxygen sensor can be used to measure the amount of EGR in the intake aircharge as a function of the amount of change in oxygen content due to the addition of EGR as a diluent. Thus, as more EGR is introduced, the sensor may output a reading or pumping current corresponding to a lower oxygen concentration. During the estimation, a nominal reference voltage (e.g., at 450 mV), or Nernst voltage, is applied to the sensor and an output (e.g., a pumping current output by the sensor upon application of the lower reference voltage) is noted. Based on the output of the sensor relative to a zero point of the sensor (that is, sensor output at no EGR conditions), a change in oxygen concentration is learned, and an intake dilution with EGR is inferred.

As such, the estimation assumes a nominal air-fuel ratio of the EGR. For example, the estimation assumes that the EGR is at or around stoichiometry. However, the sensor output is susceptible to errors if the EGR varies from a stoichiometric air-fuel ratio. For example, the sensor output may be corrupted due to excess fuel from rich EGR reacting with ambient oxygen at the sensing element of the intake sensor which reduces the (local) oxygen concentration read by the sensor. Since the output of the sensor and the change in oxygen concentration is used to infer an EGR dilution of intake aircharge, the reduced oxygen concentration read by the intake oxygen sensor in the presence of rich EGR may be incorrectly interpreted as additional diluent. This impacts the EGR estimation and the subsequent EGR control. Specifically, EGR may be over-estimated. The sensor output may also be corrupted due to the excess oxygen from lean EGR which increases the (local) oxygen concentration read by the sensor. Since the output of the sensor and the change in oxygen concentration is used to infer an EGR dilution of intake aircharge, the elevated oxygen concentration read by the intake oxygen sensor in the presence of lean EGR may be incorrectly interpreted as reduced diluent. This impacts the EGR estimation and the subsequent EGR control. Specifically, EGR may be under-estimated.

FIGS. 3A-C depict this variation in the reading of the intake sensor. Specifically, map 300 of FIG. 3A depicts an oxygen concentration estimated by an intake manifold oxygen sensor (O2 conc.) along the y-axis and an EGR air-fuel ratio (AFR) along the x-axis at a given EGR level. As the richness of the EGR increases, the hydrocarbons react with oxygen at the sensing element of the intake oxygen sensor. The oxygen is consumed and water and carbon dioxide is released. As a result, the estimated oxygen concentration is reduced, even though an amount of EGR flow may remain constant. This reduction in oxygen concentration estimated by the oxygen sensor may be inferred as an increased dilution (or replacement of oxygen with EGR). Thus, the controller may infer that there is a larger amount of EGR flow available than actually is present. If not corrected for the hydrocarbon effect, a controller may decrease EGR flow in response to an incorrect indication of higher EGR dilution, degrading EGR control.

In comparison, as the leanness of the EGR increases, the excess oxygen in the EGR may be inferred as a decreased dilution. Thus, the controller may infer that there is a smaller amount of EGR flow available than actually is present. If not corrected for the hydrocarbon effect, a controller may decrease EGR flow in response to an incorrect indication of lower EGR dilution, degrading EGR control. As such, the sensor output in the presence of lean EGR may correctly estimate a burnt mass fraction in the aircharge.

Map 320 of FIG. 3B depicts a measured EGR rate along the x-axis, as estimated based on the output of the intake oxygen sensor as a function of EGR air-fuel ratio along the y-axis. In the depicted example, the EGR rate measured in the presence of lean EGR may be correct. Therefore, on the lean side (of stoichiometry), no correction factor may be required. In comparison, the EGR rate measured in the presence of rich EGR is higher than the actual EGR rate.

That is, the EGR is overestimated. Therefore, on the rich side (of stoichiometry), a correction factor is required to reduce the measured rate to the correct EGR rate.

Map 330 of FIG. 3C depicts how such a correction factor may be applied. Specifically, map 330 depicts a correction factor (K) applied for an EGR estimate along the y-axis as learned for changing air-fuel ratio of EGR along the x-axis. As discussed above with reference to FIG. 3B, no correction factor may be required on the lean side. Therefore, on the lean side (of stoichiometry), the correction factor may be set to a value of 1.0. In comparison, on the rich side, the correction factor may be set to a value of less than 1.0 (e.g., to 0.8 or 0.9) so as to reduce the measured rate to the correct EGR rate. The corrected EGR rate may then be learned as: corrected EGR rate=(uncorrected EGR rate)×(correction factor K).

Figure 4:
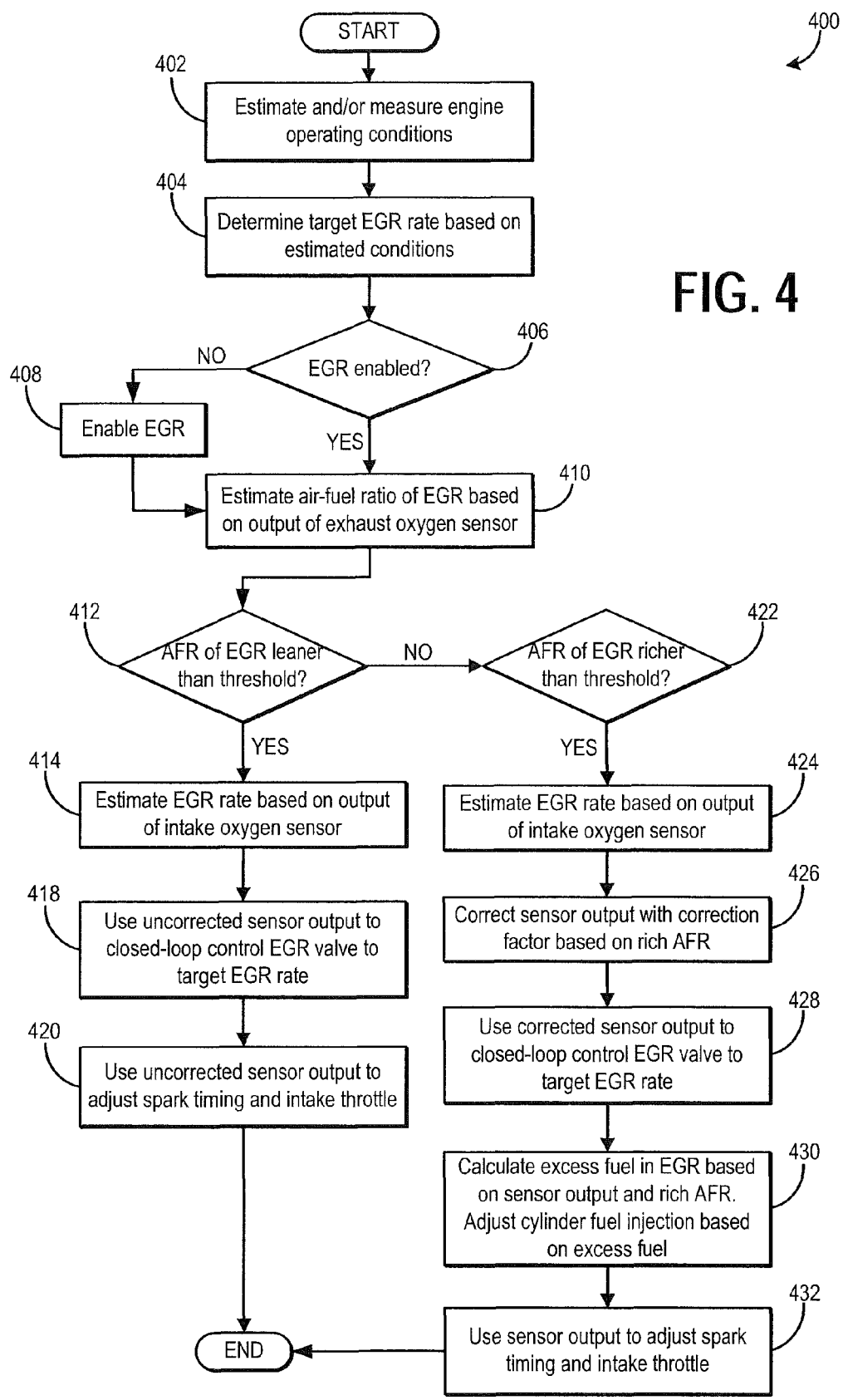
FIG. 4 depicts a flowchart for adjusting an output of an intake manifold oxygen sensor, and one or more engine operating parameters, in the presence of rich or lean EGR.

As elaborated with reference to FIG. 4, in the presence of lean or rich EGR, as estimated by an exhaust gas oxygen sensor, a correction factor may be learned and applied to the output of an intake gas oxygen sensor. The corrected sensor output may then be used to feedback adjust the position of an EGR valve to provide a target EGR rate. In addition, the corrected sensor output may be used to learn an amount of excess fuel in the rich EGR and adjust a fuel injection amount accordingly. Alternatively the uncorrected sensor output may be used to learn a burnt gas mass fraction in the EGR and adjust a spark timing and throttle opening accordingly.

Now turning to FIG. 4, a routine 400 is shown for adjusting the output of an intake oxygen sensor based on the air-fuel ratio of EGR. In addition, one or more engine operating parameters are adjusted based on whether the EGR was richer or leaner than stoichiometry. The approach allows for the air-fuel ratio effect of rich or lean EGR to be compensated for, improving the accuracy of EGR estimation, and allowing the intake oxygen sensor to be used during rich, lean and stoichiometric EGR conditions.

At 402, the routine includes estimating and/or measuring engine operating conditions. These may include, for example, engine speed, torque demand, boost, EGR, engine dilution required, engine temperature, BP, MAP, etc. At 404, a target EGR rate may be determined based on the estimated engine operating conditions. For example, a lower EGR rate may be determined at lower engine speed-load conditions while a higher EGR rate may be determined at higher engine speed-load conditions where the dilution provides more fuel economy and emissions benefits.

At 406, it may be determined if EGR has been enabled. For example, it may be determined if the EGR valve has been actuated open. If EGR is not enabled, at 408, EGR may be enabled. For example, an EGR valve may be opened. Upon confirming that EGR is enabled, at 410, an EGR air-fuel ratio may be inferred based on an output of an exhaust manifold oxygen sensor. For example, the EGR air-fuel ratio may be based on a pumping current output by the sensor. As such, the exhaust manifold oxygen sensor may be located upstream of an inlet of an EGR passage delivering exhaust residuals from the exhaust manifold, downstream of the exhaust oxygen sensor and downstream of an exhaust turbine, to the intake manifold, upstream of an intake compressor, and upstream of an intake oxygen sensor.

At 412, it may be determined if the EGR air-fuel ratio is leaner than a threshold. In one example, the threshold is stoichiometry and it is determined if the EGR air-fuel ratio is leaner than stoichiometry. If not, at 422, it may be determined if the EGR air-fuel ratio is richer than the threshold. In one example, it is determined if the EGR air-fuel ratio is richer than stoichiometry.

If the EGR air-fuel ratio is richer than stoichiometry, then at 424, an EGR rate may be estimated based on an output of an intake oxygen sensor. As such, the intake oxygen sensor may be located downstream of an outlet of the EGR passage, and upstream of an intake throttle. Specifically, the EGR rate may be estimated based on a difference between a pumping current output by the intake sensor with the EGR enabled relative to a previously learned zero point of the intake oxygen sensor (that is, a pumping current output by the intake sensor with EGR disabled). As the difference between the pumping currents increases, the controller may infer a larger amount of dilution (or displacement of intake oxygen with EGR) and therefore a larger EGR rate.

At 426, in response to the EGR air-fuel ratio being richer than the threshold, the routine includes correcting the intake manifold oxygen sensor output with a correction factor based on a richness of the EGR air-fuel ratio. Specifically, the correcting includes increasing the output of the sensor based on the degree of richness. This is because the extra fuel in the rich EGR reacts with the oxygen and causes the output sensed by the intake oxygen sensor to be decreased further. As a result, the EGR rate is over-estimated. Thus by correcting the sensor output, the EGR rate is decreased based on the degree of richness.

At 428, the corrected sensor output is used to closed-loop control a position of the EGR valve to the target EGR rate (as previously determined at 404). The closed loop adjustment includes feedback adjusting the EGR valve based on a difference between a target EGR rate and an EGR rate estimated based on the corrected sensor output while maintaining feed-forward adjustment of the EGR valve. For example, the EGR valve opening may be adjusted based on a difference between the target EGR rate desired and the actual EGR rate delivered, as estimated based on the corrected sensor output. If the desired rate is higher than the estimated rate, an opening of the EGR valve is increased. Else, if the desired rate is lower than the estimated rate, an opening of the EGR valve is decreased.

At 430, an amount of excess fuel in the EGR is calculated. In addition, a cylinder fuel injection is adjusted based on the calculated amount of excess fuel. Specifically, the amount of excess fuel in the rich EGR is estimated based on the corrected intake sensor output and the degree of richness of the EGR (or EGR air-fuel ratio). For example, the amount of excess fuel in the EGR is calculated based on each of the output of the exhaust oxygen sensor and the intake oxygen sensor (or EGR rate).

As such, the output of the exhaust oxygen sensor determines the EGR air-fuel ratio. For EGR with rich air-fuel ratio, unburned fuel is present in the EGR in the form of unburned or partially burned hydrocarbons and carbon monoxide. The concentration of unburned fuel for the measured EGR air-fuel ratio can be determined analytically by the engine controller or can be calculated ahead of time and stored in the engine controller. The total unburned fuel concentration in the intake charge is then determined by multiplying the EGR rate as determined from the corrected intake oxygen sensor by the unburned fuel concentration in the rich EGR, where the EGR air-fuel ratio is determined by the exhaust oxygen sensor. The amount of excess fuel is further adjusted for a transport delay between timing of fuel injection and timing of output from the exhaust oxygen sensor to enable time alignment. Then, a cylinder fuel injection amount is reduced based on the calculated amount of excess fuel.

At 432, one or more engine operating parameters may be adjusted based on the rich air-fuel ratio of the EGR and the EGR estimated by the intake oxygen sensor. As an example, the corrected sensor output may be used to adjust a spark timing and/or an intake throttle opening. This includes adjusting spark timing and/or adjusting an opening of the intake throttle as the sensor output increases. For example, in the case of cooled LP-EGR, spark timing may be retarded and/or intake throttle opening may be decreased as the sensor output increases (and therefore as EGR decreases).

In this way, the controller adjusts each of an EGR rate and a cylinder fuel injection based on the corrected sensor output in response to the EGR air-fuel ratio being richer than the threshold.

Returning to 412, if the EGR air-fuel ratio is leaner than the threshold, then at 414, as at 424, an EGR rate may be estimated based on an output of an intake manifold oxygen sensor. Specifically, the EGR rate may be estimated based on a difference between a pumping current output by the intake sensor with the EGR enabled relative to a previously learned zero point of the intake oxygen sensor (that is, a pumping current output by the intake sensor with EGR disabled). As the difference between the pumping currents increases, the controller may infer a larger amount of dilution (or displacement of intake oxygen with EGR) and therefore a larger EGR rate.

At 418, the sensor output is used to closed-loop control a position of the EGR valve to the target EGR rate (as previously determined at 404). The closed loop adjustment includes feedback adjusting the EGR valve based on a difference between the target EGR rate and an EGR rate estimated based on the uncorrected sensor output while feed-forward adjusting the EGR valve based on a degree of leanness of the EGR air-fuel ratio. For example, the EGR valve opening may be adjusted based on a difference between the target EGR rate desired and the actual EGR rate delivered, as estimated based on the uncorrected sensor output. If the desired rate is higher than the estimated rate, an opening of the EGR valve is increased. Else, if the desired rate is lower than the estimated rate, an opening of the EGR valve is decreased.

At 420, the routine includes adjusting one or more engine operating parameters based on the lean air-fuel ratio of the EGR and the EGR estimated by the intake oxygen sensor. As an example, one or more of spark timing and an intake throttle position is adjusted (e.g., spark timing is advanced or retarded and intake throttle opening is increased or decreased) based on the uncorrected sensor output. Herein, the uncorrected sensor output is used because the uncorrected output of the intake sensor correctly reflects the burnt mass fraction of the EGR. In one example, in the case of cooled LP-EGR, spark timing may be retarded and/or intake throttle opening may be decreased as the sensor output increases (and therefore as EGR decreases).

In one example, during a first condition, when delivering EGR that is richer than a threshold air-fuel ratio, a controller may correct an oxygen sensor output based on a richness of the EGR, adjust each of an EGR rate and spark timing based on the corrected sensor output, and adjust a fuel injection based on a corrected sensor output. Then, during a second condition, when delivering EGR that is leaner than the threshold air-fuel ratio, the controller may correct the oxygen sensor output based on a leanness of the EGR, adjust the EGR rate based on the uncorrected sensor output, and adjust each of spark timing and intake throttle position based on the uncorrected sensor output. Herein, during each of the first and second conditions, the sensor output may be further corrected based on an ethanol content of combusted fuel. For example, the sensor output may be adjusted as the ethanol content of the combusted fuel increases.

As used herein, correcting the sensor output during the first condition includes increasing the sensor output based on the richness of the EGR while the sensor output during the second condition does not need to be corrected. In addition, adjusting a fuel injection based on a corrected sensor output during the first condition includes estimating an amount of excess fuel in the EGR based on the corrected sensor output and the richness of the EGR, and reducing cylinder fuel injection based on the amount of excess fuel.

In another example, an engine system comprises, an engine including an intake and an exhaust manifold, an EGR passage including an EGR valve, the passage coupling the exhaust manifold to the intake manifold, a first oxygen sensor coupled to the intake manifold, downstream of an outlet of the EGR passage and upstream of an intake compressor, a second oxygen sensor coupled to the exhaust manifold, upstream of an inlet of the EGR passage and downstream of an exhaust turbine and a controller with computer readable instructions. The controller may be configured to estimate an air-fuel ratio of EGR based on an output of the second oxygen sensor. If the estimated air-fuel ratio is richer than stoichiometry, the controller may increase the output of the first sensor based on the degree of richness while feed-forward adjusting an opening of the EGR valve based on the increased output of the first sensor. Else, if the estimated air-fuel ratio is leaner than stoichiometry, the controller may feed-back adjust the EGR valve opening based on uncorrected output from the first sensor while feed-forward adjusting the opening of the EGR valve based on the degree of leanness of the second sensor.

The controller includes further instructions for, feed-back adjusting the opening of the EGR valve based on the increased output of the first sensor if the estimated air-fuel ratio is richer than stoichiometry, and feed-back adjusting the opening of the EGR valve based on the uncorrected output of the first sensor if the estimated air-fuel ratio is leaner than stoichiometry. The controller may also be configured with code for retarding spark timing based on the increased output of the first sensor if the estimated air-fuel ratio is richer than stoichiometry, and retarding spark timing based on the un-adjusted output of the first sensor if the estimated air-fuel ratio is leaner than stoichiometry.

The controller may be further configured with instructions for, decreasing an engine fuel injection based on the increased output of the first sensor if the estimated air-fuel ratio is richer than stoichiometry, and decreasing an engine intake airflow based on the un-decreased output of the first sensor if the estimated air-fuel ratio is leaner than stoichiometry. Finally, the controller may include further instructions for, estimating an alcohol content of fuel burned in the engine based on an output of the second sensor, and further adjusting an output of the first sensor based on the estimated alcohol content when the estimated air-fuel ratio is leaner or richer than stoichiometry.

In this way, the output of an intake oxygen sensor can be adjusted for the effect of changing air-fuel ratio of EGR. By increasing the sensor output with a correction factor when the EGR is richer than stoichiometry, EGR rate estimation errors from the excess fuel in the rich EGR air-fuel ratio can be accounted for. By also reducing cylinder fuel injection in accordance with the amount of excess fuel in the rich EGR, fuel control is improved and the likelihood of fuel system errors being falsely triggered is reduced. By using the uncorrected sensor output when the EGR is leaner than stoichiometry, EGR rate estimation in the presence of excess air in the lean EGR air-fuel ratio can be improved. As such, this allows the output of an intake manifold oxygen sensor to be used for EGR estimation during stoichiometric, as well as lean or rich EGR conditions, improving EGR control over a wider range of engine operating conditions.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-3, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
in response to an EGR air-fuel ratio being richer than a threshold,
correcting an intake oxygen sensor output with a correction factor based on a richness of the EGR air-fuel ratio; and
adjusting each of an EGR rate and a cylinder fuel injection based on the corrected intake oxygen sensor output.

2. The method of claim 1, further comprising, inferring the EGR air-fuel ratio based on an output of an exhaust oxygen sensor.

3. The method of claim 2, wherein an intake oxygen sensor is located downstream of an outlet of an EGR passage and wherein the exhaust oxygen sensor is located upstream of an inlet of the EGR passage.

4. The method of claim 2, wherein the correcting includes increasing the output of an intake oxygen sensor as a degree of richness increases.

5. The method of claim 4, wherein adjusting the cylinder fuel injection includes calculating an amount of excess fuel in recirculating exhaust gas (EGR) and reducing a cylinder fuel injection based on the calculated amount of excess fuel.

6. The method of claim 5, wherein the amount of excess fuel in the EGR is calculated based on each of the output of the exhaust oxygen sensor and the EGR rate.

7. The method of claim 6, wherein the amount of excess fuel is further adjusted for a transport delay between timing of fuel injection and timing of output from the exhaust oxygen sensor to enable time alignment.

8. The method of claim 4, wherein adjusting the EGR rate includes feedback adjusting an EGR valve based on a difference between a target EGR rate and an EGR rate estimated based on the corrected intake oxygen sensor output while maintaining feed-forward adjustment of the EGR valve.

9. The method of claim 8, further comprising, in response to the EGR air-fuel ratio being leaner than the threshold,
feedback adjusting the EGR valve based on a difference between the target EGR rate and an EGR rate estimated based on an uncorrected sensor output; and
feed-forward adjusting the EGR valve based on a degree of leanness of the EGR air-fuel ratio.

10. The method of claim 9, further comprising, adjusting one or more of spark timing and an intake throttle position based on an uncorrected sensor output.

11. The method of claim 1, wherein the threshold includes a stoichiometric air-fuel ratio.

12. A method for an engine, comprising:
during a first condition, when delivering EGR that is richer than a threshold air-fuel ratio,
correcting an intake oxygen sensor output based on a richness of the EGR, adjusting each of an EGR rate and spark timing based on a corrected intake oxygen sensor output, and adjusting a fuel injection based on the corrected intake oxygen sensor output; and
during a second condition when delivering EGR that is leaner than the threshold air-fuel ratio,
adjusting the EGR rate based on an uncorrected intake oxygen sensor output, and adjusting each of spark timing and intake throttle position based on the uncorrected intake oxygen sensor output.

13. The method of claim 12, wherein during the first condition, the corrected intake oxygen sensor output is further corrected based on an ethanol content of combusted fuel, and wherein during the second condition, the uncorrected intake oxygen sensor output is corrected based on the ethanol content of combusted fuel.

14. The method of claim 12, wherein correcting the intake oxygen sensor output during the first condition includes increasing the corrected intake oxygen sensor output based on the richness of the EGR.

15. The method of claim 14, wherein adjusting the fuel injection based on the corrected intake oxygen sensor output during the first condition includes estimating an amount of excess fuel in the EGR based on the corrected intake oxygen sensor output and the richness of the EGR, and reducing cylinder fuel injection based on the amount of excess fuel.

16. An engine system, comprising:
an engine including an intake manifold and an exhaust manifold;

an EGR passage including an EGR valve, the EGR passage coupling the exhaust manifold to the intake manifold;

a first oxygen sensor coupled to the intake manifold, downstream of an outlet of the EGR passage and upstream of an intake throttle;

a second oxygen sensor coupled to the exhaust manifold, upstream of an inlet of the EGR passage; and a controller with computer readable instructions for:
  estimating an air-fuel ratio of EGR based on an output of the second oxygen sensor;
  if an estimated air-fuel ratio of the EGR is richer than a stoichiometric air-fuel ratio, increasing an output of the first oxygen sensor based on a degree of richness while feed-forward adjusting an opening of the EGR valve based on an increased output of the first oxygen sensor; and
  if the estimated air-fuel ratio of the EGR is leaner than the stoichiometric air-fuel ratio, feed-forward adjusting the opening of the EGR valve based on an unadjusted output of the first oxygen sensor.

17. The system of claim 16, wherein the controller includes further instructions for, feed-back adjusting the opening of the EGR valve based on the increased output of the first oxygen sensor if the estimated air-fuel ratio of the EGR is richer than the stoichiometric air-fuel ratio, and feed-back adjusting the opening of the EGR valve based on the unadjusted output of the first oxygen sensor if the estimated air-fuel ratio of the EGR is leaner than the stoichiometric air-fuel ratio.

18. The system of claim 17, wherein the controller includes further instructions for, retarding spark timing based on the increased output of the first oxygen sensor if the estimated air-fuel ratio of the EGR is richer than the stoichiometric air-fuel ratio, and retarding spark timing based on the unadjusted output of the first oxygen sensor if the estimated air-fuel ratio of the EGR is leaner than the stoichiometric air-fuel ratio.

19. The system of claim 18, wherein the controller includes further instructions for, decreasing an engine fuel injection based on the increased output of the first oxygen sensor if the estimated air-fuel ratio of the EGR is richer than the stoichiometric air-fuel ratio, and decreasing an engine intake airflow based on the unadjusted output of the first oxygen sensor if the estimated air-fuel ratio of the EGR is leaner than the stoichiometric air-fuel ratio.

20. The system of claim 19, wherein the controller includes further instructions for, estimating an alcohol content of fuel burned in the engine based on an output of the second oxygen sensor, and further adjusting an output of the first oxygen sensor based on an estimated alcohol content when the estimated air-fuel ratio of the EGR is leaner or richer than the stoichiometric air-fuel ratio.

* * * * *